US012255771B2

(12) United States Patent
Zhu

(10) Patent No.: US 12,255,771 B2
(45) Date of Patent: Mar. 18, 2025

(54) PACKET PROCESSING METHOD AND DEVICE, ADVERTISEMENT METHOD AND DEVICE, BRIDGE NODE, SOURCE APPARATUS, STORAGE MEDIUM, AND PACKET PROCESSING SYSTEM

(71) Applicant: ZTE CORPORATION, Guangdong (CN)

(72) Inventor: Xiangyang Zhu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 239 days.

(21) Appl. No.: 17/924,390

(22) PCT Filed: May 19, 2021

(86) PCT No.: PCT/CN2021/094572
§ 371 (c)(1),
(2) Date: Nov. 10, 2022

(87) PCT Pub. No.: WO2021/233327
PCT Pub. Date: Nov. 25, 2021

(65) Prior Publication Data
US 2023/0145093 A1    May 11, 2023

(30) Foreign Application Priority Data
May 19, 2020  (CN) .......................... 202010425664.8

(51) Int. Cl.
*H04L 41/0806*   (2022.01)
*H04L 41/00*   (2022.01)
(Continued)

(52) U.S. Cl.
CPC .......... *H04L 41/0806* (2013.01); *H04L 41/00* (2013.01); *H04L 41/0896* (2013.01);
(Continued)

(58) Field of Classification Search
CPC ... H04L 47/2475; H04L 45/02; H04L 45/745; H04L 47/2408; H04L 47/28; H04L 41/00;
(Continued)

(56) References Cited

U.S. PATENT DOCUMENTS

2016/0261492 A1   9/2016  Xiao et al.
2019/0058668 A1   2/2019  Gunther
(Continued)

FOREIGN PATENT DOCUMENTS

CN   104639470 A   5/2015
CN   109639493 A   4/2019

OTHER PUBLICATIONS

WIPO, International Search Report issued on Jul. 28, 2021.
(Continued)

*Primary Examiner* — Adil Ocak
(74) *Attorney, Agent, or Firm* — Li & Cai Intellectual Property (USA) Office

(57) ABSTRACT

The present application relates to the field of network communication technologies, and provides a packet processing method and device, an advertisement method and device, a bridge node, a source apparatus, a packet processing system, and a computer-readable storage medium. The packet processing method includes: receiving a time sensitive networking (TSN) service packet; querying, according to a packet header of the TSN service packet, a mapping table of service stream IDs and TSN-profiles, where the mapping table of service stream IDs and TSN-profiles is established according to advertisement information of a source apparatus; and processing the TSN service packet according to a result of the querying on the mapping table of service stream IDs and TSN-profiles.

20 Claims, 6 Drawing Sheets

(51) Int. Cl.
| | |
|---|---|
| *H04L 41/0896* | (2022.01) |
| *H04L 45/02* | (2022.01) |
| *H04L 45/745* | (2022.01) |
| *H04L 47/2408* | (2022.01) |
| *H04L 47/2475* | (2022.01) |
| *H04L 47/28* | (2022.01) |
| *H04L 65/65* | (2022.01) |
| *H04L 67/30* | (2022.01) |

(52) U.S. Cl.
CPC ............ *H04L 45/02* (2013.01); *H04L 45/745* (2013.01); *H04L 47/2408* (2013.01); *H04L 47/2475* (2013.01); *H04L 47/28* (2013.01); *H04L 65/65* (2022.05); *H04L 67/30* (2013.01)

(58) Field of Classification Search
CPC . H04L 45/74; H04L 43/0876; H04L 41/0853; H04L 41/0896; H04L 65/65; H04L 65/80; H04L 67/30; H04L 69/22; H04L 41/0806; H04L 41/0836; H04L 67/1001; H04L 67/1095; H04L 67/146; Y02D 30/00
USPC ........................................................ 709/238
See application file for complete search history.

(56) References Cited

U.S. PATENT DOCUMENTS

| | | |
|---|---|---|
| 2020/0137615 A1 | 4/2020 | Joseph et al. |
| 2020/0267785 A1* | 8/2020 | Talebi Fard ............ H04L 45/04 |
| 2021/0007160 A1* | 1/2021 | Sivasiva Ganesan ....................... H04W 8/005 |
| 2021/0250281 A1* | 8/2021 | Li ......................... H04L 45/302 |

OTHER PUBLICATIONS

European Patent Office, entended European Search Report dated Mar. 26, 2024, for corresponding EP application No. 21808796.3.
Lee Juho, et al., "Time-sensitive Network profile Service for Enhanced In-Vehicle Stream Reservation", 2019 4th International Conference on Control, Robotics and Cybernetics, IEEE, dated Sep. 27, 2019.
Lo Bello Lucia, et al., "A Perspective on IEEE Time-Sensitive Networking for Industrial Communication and Automation Systems"; Proceedings of IEEE, IEEE, New York, Jun. 1, 2019.

* cited by examiner

```
Octet#
1                                           7         8
| MAC Address                             | Unique ID |
Octet#
9                                          15        16
| Destination Address                     | VLAN_ID   |
Octet#
17                          19                       20
| MaxFrameSize             | MaxIntervalFrames        |
Octet#
21
| DataFramePriority(3bits) | Rank | Reserved(4bit)    |
Octet#
22                          25                       26
| Accumulated Latency      | TSN-profile              |
Octet#
27                                                   35
| SystemId                                | Failure Code |
```

FIG. 4

PACKET PROCESSING METHOD AND DEVICE, ADVERTISEMENT METHOD AND DEVICE, BRIDGE NODE, SOURCE APPARATUS, STORAGE MEDIUM, AND PACKET PROCESSING SYSTEM

TECHNICAL FIELD

The present application relates to the field of network communication technologies.

BACKGROUND

The time sensitive networking (TSN) standard defines a time sensitive mechanism for Ethernet data transmission, and increases determinacy and reliability of the standard Ethernet to ensure that the Ethernet can provide a stable and consistent service level for transmission of critical data. For a TSN service, the various policies and mechanisms configured to provide consistent deterministic services are collectively called TSN-profile. There may be a plurality of TSN-profile instances in the standard, and each bridge node (i.e., TSN node) may support 0, 1, or more TSN-profile capabilities.

SUMMARY

In one aspect, an embodiment of the present application provides a packet processing method applicable to a bridge node, including: receiving a TSN service packet; querying, according to a packet header of the TSN service packet, a mapping table of service stream IDs and TSN-profiles, wherein the mapping table of service stream IDs and TSN-profiles is established according to advertisement information of a source apparatus; and processing the TSN service packet according to a result of the querying on the mapping table of service stream IDs and TSN-profiles.

In another aspect, an embodiment of the present application further provides an advertisement method applicable to a source apparatus, including: sending advertisement information including a service stream ID and a corresponding TSN-profile; and sending a TSN service packet to be processed by the bridge node according to the advertisement information.

In another aspect, an embodiment of the present application further provides a bridge node, including: one or more processors; and a storage device configured to store one or more programs; wherein the one or more programs, when executed by the one or more processors, cause the one or more processors to implement the packet processing method described in any embodiment of the present application.

In one aspect, an embodiment of the present application provides a source apparatus, including: one or more processors; and a storage device configured to store one or more programs; wherein the one or more programs, when executed by the one or more processors, cause the one or more processors to implement the advertisement method described in any embodiment of the present application.

In another aspect, an embodiment of the present application further provides a packet processing system, including: a destination apparatus, at least one bridge node, and a source apparatus; wherein: the source apparatus is configured to send advertisement information to the at least one bridge node, the advertisement information including a service stream ID and a corresponding TSN-profile; the at least one bridge node is configured to receive a time sensitive networking (TSN) service packet; query, according to a packet header of the TSN service packet, a mapping table of service stream IDs and TSN-profiles, wherein the mapping table of service stream IDs and TSN-profiles is established according to advertisement information of a source apparatus; and process the TSN service packet according to a result of the querying on the mapping table of service stream IDs and TSN-profiles; and the destination apparatus is configured to receive the TSN service packet processed by the at least one bridge node.

In another aspect, an embodiment of the present application further provides a computer-readable storage medium storing a computer program thereon which, when executed by a processor, causes the processor to perform the packet processing method or advertisement method described in any embodiment of the present application to be implemented.

BRIEF DESCRIPTION OF DRAWINGS

FIG. 4 is a schematic diagram of a Stream Reservation Protocol (SRP) extended packet according to an embodiment of the present application.

DETAIL DESCRIPTION OF EMBODIMENTS

Figure 1:
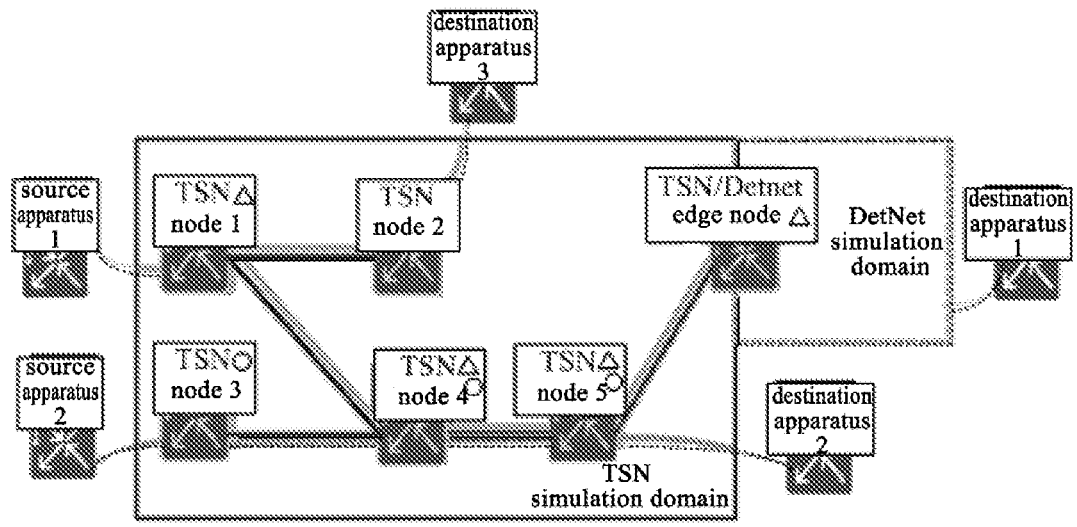
FIG. 1 is a schematic diagram of an application scenario of TSN.

The present application will be described below with reference to the accompanying drawings and embodiments. It will be appreciated that the specific embodiments described herein are used merely for the purpose of explaining the present application instead of limiting the present application. It should be noted that the implementations in the embodiments of the present application and features therein may be combined with each other in any manner as long as they are not contradictory. It should be further noted that, for the convenience of description, merely some of the structures associated with the present application, not all the structures, are shown in the drawings.

In a TSN service packet processing system, there are usually multiple bridge nodes (i.e., TSN nodes), each of which may support 0, 1, or more TSN-profile capabilities. When a TSN node receives packets of a certain TSN service stream, if the TSN node has the TSN-profile capability desired by the TSN service stream, the TSN node may provide a service consistent with requirements of the TSN service.

FIG. 1 is a schematic diagram of an application scenario of TSN. As shown in FIG. 1, there are six TSN nodes in the TSN simulation domain, where the source apparatus refers to an issue node (Talker) in the TSN network; and the destination apparatus refers to a listening node (Listener) in the TSN network. In FIG. 1, presence or absence of a hollow triangle and a hollow circle on the icon of each TSN node respectively represent whether the TSN node supports a TSN-profile corresponding to a service stream of a source apparatus 1 (Talker 1) and whether the TSN node supports a TSN-profile corresponding to a service stream of a source apparatus 2 (Talker 2). Presence of the hollow triangle or hollow circle indicates supporting of the TSN-profile, and absence of the hollow triangle or hollow circle indicates not supporting of the TSN-profile. The service stream of the source apparatus 1 takes a destination apparatus 1 (Listener 1) and a destination apparatus 3 (Listener 3) as the destination nodes, and the service stream of the source apparatus 2 takes a destination apparatus 2 (Listener 2) as the destination node. It is assumed that a service path has been established from the source apparatus 1 to the destination apparatus 1: source apparatus 1->TSN node 1->TSN node 4->TSN node 5->TSN/DetNet edge node; and a service path is established from the source apparatus 1 to the destination apparatus 3: source apparatus 1->TSN node 1->TSN node 2. When TSN node 1, TSN node 2, TSN node 4, and TSN node 5 or TSN/DetNet receives a TSN service packet from the source apparatus 1, a TSN-profile corresponding to the service packet is desired to be identified. If the TSN node (TSN node 1, TSN node 4, TSN node 5 or TSN/DetNet) supports the TSN-profile, the TSN service packet is processed according to a corresponding policy; and if the TSN node (TSN node 2) does not support the TSN-profile, the TSN service packet is processed according to an original forwarding process.

Since there is no effective standard protocol or scheme that can regulate collection, judgment and propagation of TSN-profile capabilities at each TSN node, whether each TSN node can provide a service consistent with requirements of the TSN service stream cannot be determined. If the TSN service packet reaches a TSN node not having the corresponding capability, the processing efficiency of the TSN service packet may be affected. Therefore, processing of the TSN service packet has a poor reliability.

An embodiment of present application provides a packet processing method applicable to a bridge node. When a bridge node receives a TSN service packet, it is determined, by querying a mapping table established according to advertisement information of a source apparatus, whether the bridge node has a TSN-profile capability for the TSN service packet, so that the TSN service packet is processed accordingly, and the reliability of TSN service packet processing is improved.

Figure 2:
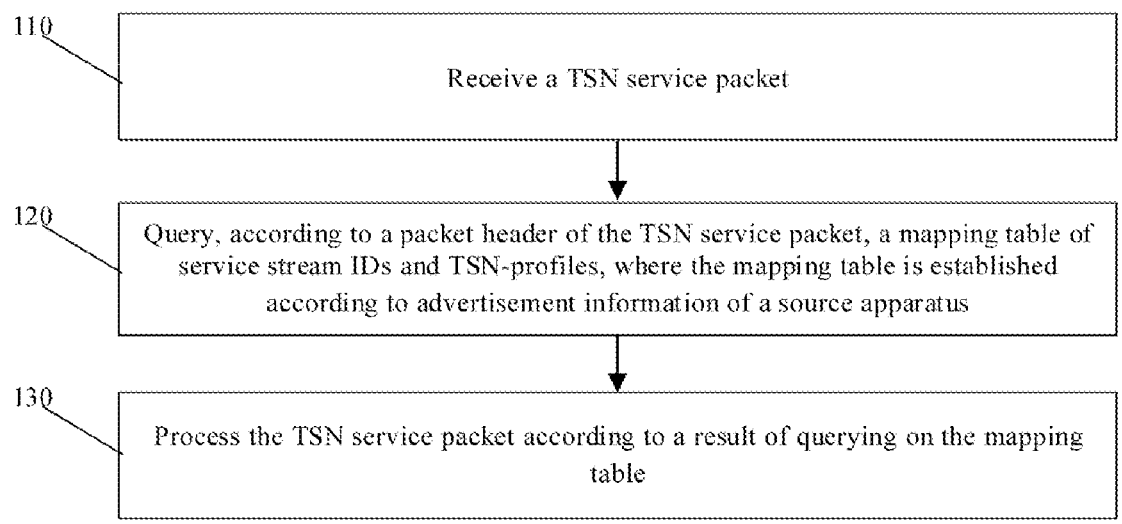
FIG. 2 is a flowchart of a packet processing method according to an embodiment of the present application.

FIG. 2 is a flowchart of a packet processing method according to an embodiment of the present application. As shown in FIG. 2, the method may include operations 110, 120, and 130.

At operation 110, receiving a TSN service packet.

According to an embodiment of the present application, the TSN service packet may be a packet sent from a source apparatus and finally transmitted to a destination apparatus after being processed by a bridge node. It should be noted that, for a bridge node, the TSN service packet received by the bridge node may be sent from the source apparatus and directly reach the bridge node, or may be sent from the source apparatus and reach the bridge node after passing through other bridge nodes.

At operation 120, querying, according to a packet header of the TSN service packet, a mapping table of service stream IDs and TSN-profiles, where the mapping table is established according to advertisement information of a source apparatus.

According to an embodiment of the present application, information carried in a packet header of the TSN service packet may indicate which service stream the TSN service packet belongs to, what TSN-profile is desired, and the like, while in the bridge node, a mapping table of service stream IDs and TSN-profiles is established in advance according to the advertisement information sent from the source apparatus. Therefore, upon receiving a TSN service packet, the bridge node may query, according to a packet header of the TSN service packet, the mapping table to determine whether the bridge node has the TSN-profile for processing the TSN service packet.

At operation 130, processing the TSN service packet according to a result of the querying on the mapping table.

According to an embodiment of the present application, the bridge node may determine, by querying the mapping table, whether the bridge node has the TSN-profile for processing the TSN service packet. If the bridge node has the TSN-profile for processing the TSN service packet, the bridge node is capable of providing a service consistent with requirements of the TSN service stream; otherwise, the bridge node may not effectively process the TSN service packet.

In an implementation, before querying, according to the packet header of the TSN service packet, the mapping table of service stream IDs and TSN-profiles, the method may further include: acquiring the advertisement information of the source apparatus in response to an advertisement trigger condition, where the advertisement information includes a service stream ID and a corresponding TSN-profile; and extracting, under the condition of meeting a preset condition, the service stream ID and the TSN-profile supported by the bridge node from the advertisement information, and writing the service stream ID and the TSN-profile into a local mapping table.

According to an embodiment of the present application, when the advertisement is triggered, the source apparatus may send the advertisement information to the bridge node by extended SRP, LLDP or the like, so as to advertise a service stream ID of the TSN service packet and the desired TSN-profile to the bridge node. After the service stream ID and the desired TSN-profile are advertised to the bridge node, the bridge node may extract key information therefrom and establish a mapping table of service stream IDs and TSN-profiles, so that query can be made according to the packet header and corresponding processing can be carried out when the TSN service packet is received.

According to an embodiment of the present application, the bridge node is desired to maintain the TSN-profile it supports, and establish a mapping table of service stream IDs and TSN-profiles according to the advertisement information.

Table 1 is a mapping table of service stream IDs and TSN-profiles. As shown in table 1, each service stream ID corresponds to one TSN-profile, and each TSN-profile may be represented by a different profile value. For example, for the service stream {01:00:5e:01:01:01,2}, it corresponds to TSN-profile "1", which means that the bridge node is desired to have a TSN-profile for video systems in P802.1DG. Upon receiving the advertisement information, the bridge node extracts the service stream ID and the TSN-profile therefrom, and writes the service stream ID and the TSN-profile into the mapping table shown in table 1.

TABLE 1

Mapping table of service stream IDs and TSN-profiles

| Service stream identifier (ID) | TSN-profile value | TSN-profile |
|---|---|---|
| {01:00:5e:01:01:01, 2} | 1 | P802.1DG: Profile for Audio Systems |
| {01:00:5e:01:01:02, 3} | 2 | P802.1DG: Profile for Video Systems |
| {01:00:5e:01:01:03, 2} | 3 | P802.1DG: Profile for Control Systems |
| {01:00:5e:01:01:04, 4} | 4 | P802.1DG: Profile for Audio Systems |
| ... | ... | ... |

In an implementation, the TSN-profiles may include, but are not limited to: 1) P802.1CM-2018, a TSN-profile for fronthaul TSN networks; 2) IEC/IEEE 60802, a TSN-profile for industrial automation; 3) P802.1DC, a TSN-profile for Quality of Service (QoS) for network systems; 4) P802.1DF, a TSN-profile for service provider networks; 5) P802.1DG, a TSN-profile for automotive in-vehicle Ethernet communications; and/or, 6) P802.1CMde, an enhanced TSN-profile for fronthaul profile files supporting new fronthaul interfaces and synchronization standards.

In the case of employing different extended protocol packets, the format, profile value, definition and the like of the field carrying the TSN-profile may vary, which are not limited in the embodiments of the present application.

In an implementation, before querying, according to the packet header of the TSN service packet, the mapping table of service stream IDs and TSN-profiles, the method may further include: reserving, under the condition of meeting the preset condition, a bandwidth resource for processing the TSN service packet, and establishing a forwarding table entry for the TSN service packet.

According to an embodiment of the present application, under the condition of meeting the preset condition, the bridge node may perform corresponding processing upon receiving the TSN service packet by reserving a bandwidth resource and establishing a forwarding table entry for the TSN service packet.

In an implementation, processing the TSN service packet according to the result of the querying may include: using, if the packet header is consistent with the service stream ID and the TSN-profile supported by the bridge node, the reserved bandwidth resource to forward the TSN service packet to the destination apparatus according to the forwarding table entry.

According to an embodiment of the present application, after the bandwidth resource are successfully reserved and the forwarding path is established, the TSN service packet is sent from the source apparatus and transmitted along a certain service path. When each bridge node receives the TSN service packet, the packet header thereof is parsed to obtain the service stream ID, based on which the mapping table is queried and the TSN-profile desired for the service stream is determined. If the bridge node has the corresponding TSN-profile, the reserved bandwidth resource may be used for processing and forwarding the packet according to the forwarding table entry; otherwise, the TSN service packet may not be processed.

Figure 3:
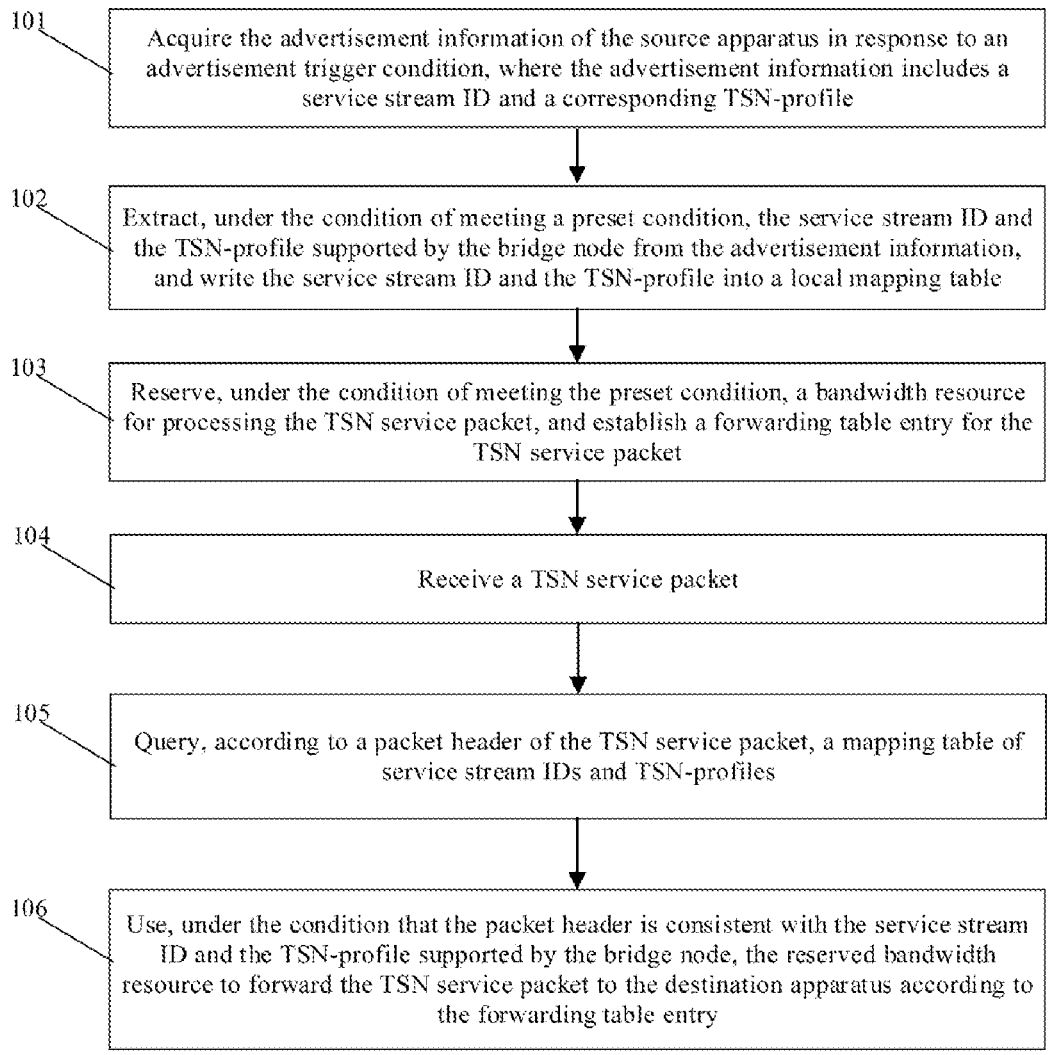
FIG. 3 is another flowchart of a packet processing method according to an embodiment of the present application.

FIG. 3 is another flowchart of a packet processing method according to an embodiment of the present application. As shown in FIG. 3, the packet processing method may include operations 101 to 106.

At operation 101, acquiring the advertisement information of the source apparatus in response to an advertisement trigger condition, where the advertisement information includes a service stream ID and a corresponding TSN-profile.

In an implementation, the advertisement trigger condition may include at least one of: receiving an advertisement trigger command, receiving a first TSN service packet sent from the source apparatus, or receiving a protocol extended packet sent from the source apparatus.

According to an embodiment of the present application, the advertisement trigger condition may include, but is not limited to: 1) receiving an advertisement trigger command, where the advertisement trigger command may be generated by any node in the TSN network, for example, sent from a client connected to a node in the TSN network, and after the advertisement trigger command is received by a source apparatus or a bridge node, the source apparatus is triggered to send advertisement information to each bridge node, where the advertisement information is received and a mapping table is established; 2) receiving a first TSN service packet sent from the source apparatus, which means that the source apparatus may trigger advertisement of the TSN-profile through the TSN service packet; for example, when a bridge node directly connected to the source apparatus receives a first TSN service packet from the source apparatus, the bridge node acts as an agent to initiate the advertisement process; and 3) receiving a protocol extended packet sent from the source apparatus, which means that the source apparatus may trigger advertisement of the TSN-profile through a protocol extended packet; and in this case, the source apparatus should support extension of a related protocol (such as SRP or LLDP or the like).

At operation 102, extracting, under the condition of meeting a preset condition, the service stream ID and the TSN-profile supported by the bridge node from the advertisement information, and writing the service stream ID and the TSN-profile into a local mapping table.

At operation 103, reserving, under the condition of meeting the preset condition, a bandwidth resource for processing the TSN service packet, and establishing a forwarding table entry for the TSN service packet.

In an implementation, the preset condition may include a case where: the service stream ID in the advertisement information is matched with a service stream ID of a response packet of a destination apparatus, and a bandwidth resource of the bridge node is greater than or equal to a bandwidth resource desired for the TSN service corresponding to the service stream ID.

According to an embodiment of the present application, taking SRP-based advertisement as an example, the bridge node matches a Stream Id field carrying the advertisement information in a broadcast packet (i.e., Talker Advertise packet) from the source apparatus with a Stream Id field of a response packet (i.e., Listener Ready packet) from the destination apparatus. If the two Stream Id fields are matched, it is determined, according to a value of a Data Frame Priority field in the Talker Advertise packet, whether the bandwidth resource for a queue on a corresponding port of the bridge node meets requirements of the service stream. If the bandwidth resource for the queue on the corresponding port of the bridge node meets requirements of the service stream, the service stream ID in the advertisement information and a profile value of the TSN-profile are written into the mapping table, a bandwidth resource is reserved for processing the TSN service packet, and a forwarding table entry for the TSN service packet is established. If the bandwidth resource for the queue on the corresponding port of the bridge node fails to meet requirements of the service stream, the resource reservation fails and the forwarding table entry may not be established.

At operation 104, receiving a TSN service packet.

At operation 105, querying, according to a packet header of the TSN service packet, a mapping table of service stream IDs and TSN-profiles.

At operation 106, using, under the condition that the packet header is consistent with the service stream ID and the TSN-profile supported by the bridge node, the reserved bandwidth resource to forward the TSN service packet to the destination apparatus according to the forwarding table entry.

In an implementation, the advertisement information may be transmitted through a protocol extended packet of SRP; and the protocol extended packet may include a service stream ID field and a TSN-profile field.

FIG. 4 is a schematic diagram of an SRP extended packet (i.e., protocol extended packet of SRP) according to an embodiment of the present application. The embodiment of the present application takes SRP as an example to describe the protocol extended packet carrying the advertisement information. In the case of employing SRP, the advertisement information is carried by extending the Talker Advertise packet of the SRP, and the extended Talker Advertise packet has a format as shown in FIG. 4, where a TSN-profile field occupies 2 Octets, and may represent at most 216 TSN-profiles. Different profile values of the TSN-profile field may include, for example: TSN-Profile=1, indicating a profile for audio systems of P802.1DG; TSN-Profile=2, indicating a profile for video systems of P802.1DG; TSN-Profile=3, indicating a profile for control systems of P802.1DG; TSN-Profile=4, indicating Profile1 of P802.1DF; and TSN-Profile=5, indicating Profile2 of P802.1DF; so on and so forth.

The profile values and definitions of the TSN-profile field listed in the embodiments of the present application are merely used as examples for explanation, and are not limited in the embodiments of the present application.

Figure 5:
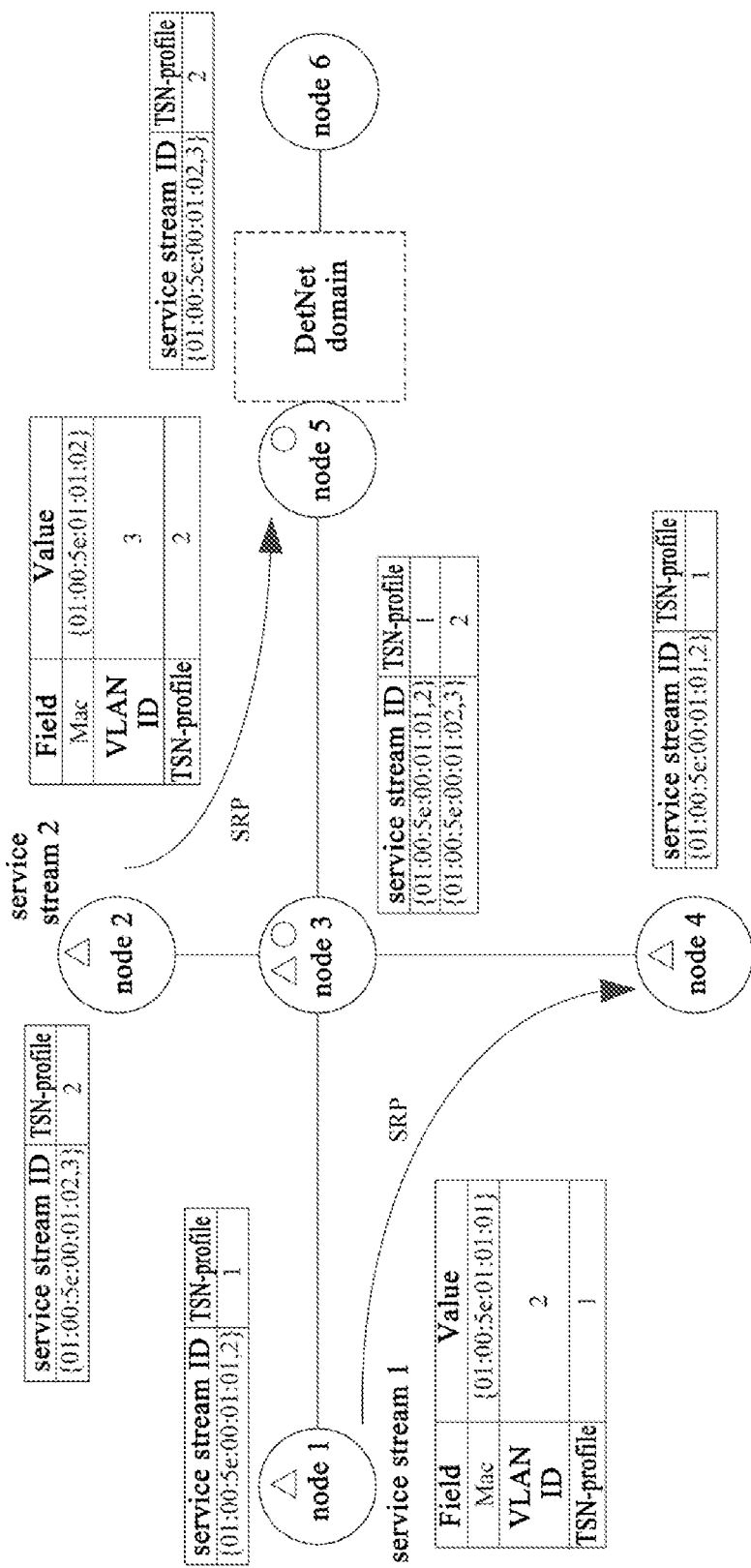
FIG. 5 is a schematic diagram of advertising a TSN-profile according to an embodiment of the present application.

FIG. 5 is a schematic diagram of advertising a TSN-profile according to an embodiment of the present application. In FIG. 5, the hollow triangle on the icon of any bridge node indicates that the bridge node supports the TSN-profile desired for the service stream (Stream 1), and the hollow circle on the icon of any bridge node indicates that the bridge node supports the TSN-profile desired for the service stream (Stream 2).

For the bridge node 1, the table above the bridge node 1 shows field contents of a Talker Advertise packet header of Stream 1, which indicates that the service stream ID of Stream 1 is {01: 00: 5e: 01: 01: 01, 2}, and the profile value corresponding to the desired TSN-profile is 1. In addition, the SRP extended packet below the bridge node 1 further shows that the virtual local area network (VLAN) ID is 2. Likewise, the table on the left side of the bridge node 2 shows field contents of a Talker Advertise packet header of Stream 2, which indicates that the service stream ID of Stream 2 is {01: 00: 5e: 01: 01: 02, 3}, and the profile value corresponding to the desired TSN-profile is 2. In addition, the SRP extended packet on the right side of the bridge node 2 further shows that the VLAN ID is 3.

During transmission of the SRP extended packet, a path of bridge node 1->bridge node 3->bridge node 4 is established for Stream 1, a path bridge of node 2->bridge node 3->bridge node 5 is established for Stream 2, and the mapping table of service stream IDs and TSN-profiles established by each bridge node is displayed near the bridge node icon in the form of a table. Among the bridge nodes 1, 3 and 4, each bridge node extracts the service stream ID {01: 00: 5e: 01: 01: 01, 2} of Stream 1 and the TSN-profile value "1" to write into the mapping table. Among the bridge nodes 2, 3 and 5, each bridge node extracts the service stream ID {01: 00: 5e: 01: 01: 02, 3} of Stream 2 and the TSN-profile value "2" to write into the mapping table.

In an implementation, the advertisement information may be transmitted through an LLDP packet; and a content field in the LLDP packet carries the service stream ID and the TSN-profile.

Figure 6:
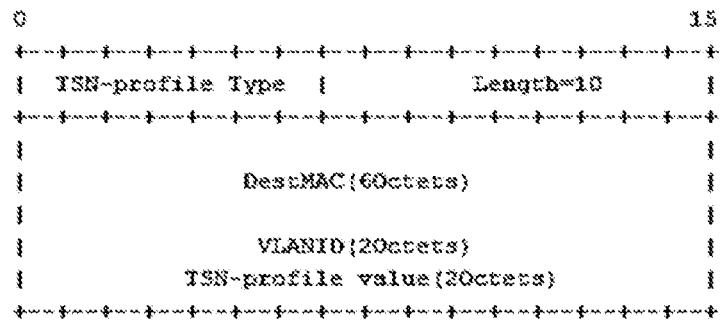
FIG. 6 is a schematic diagram of a Link Layer Discovery Protocol (LLDP) extended packet according to an embodiment of the present application.

FIG. 6 is a schematic diagram of an LLDP extended packet (i.e., LLDP packet) according to an embodiment of the present application. An extensible Type-length-value (TLV) field (i.e., an Optional TLVs field) in the LLDP packet (LLDP Data Unit, LLDPDU), may be extended to carry the advertisement information, and the definition and format of the extended sub-TLV may be specified as desired. For example, in Optional TLVs, a sub-TLV of one TSN-profile is carried. As shown in FIG. 6, the Type field indicates a type (profile value) of the TSN-profile, occupies 7 bits, and is uniformly allocated by an organization, with a value range of 9 to 126. The Length field represents a length of the Value field, occupies 9 bits, and takes Octet as a unit for the field value. The Value field contains two parts, namely a service stream ID and a TSN-profile, where the service stream ID further includes Dest MAC occupying 6 Octets and VLAN ID occupying 2 Octets. The TSN-profile may occupy 2 Octets and represent 216 TSN-profiles at most. The profile values and definitions of the TSN-profile are not limited herein.

In FIG. 6, the first 6 Octets of the Value field indicate Dest MAC, the following 2 Octets indicate VLAN ID, and the last 2 Octets indicate TSN-profile. After receiving the protocol extended packet of LLDP, the bridge node may, according to the sub-TLV carrying the TSN-profile in the Optional TLVs, extract the Dest MAC, VLAN ID, and TSN-profile value carried in the Value field, and write a mapping relationship of {DestMAC, VlanID} and the TSN-profile into the mapping table.

In an implementation, the advertisement information may be sent through a protocol other than SRP or LLDP, and the used protocol and packet format, and the contents of the service stream ID field and the TSN-profile field are not limited in the embodiment of the present application.

According to the packet processing method provided in the embodiments of the present application, the source apparatus may advertise the service stream ID and the corresponding TSN-profile to each bridge node, so that the bridge node can establish a mapping table, and, upon receiving a TSN service packet, query the mapping table to process the TSN service packet accordingly. Therefore, the TSN-profile capability of the bridge node is determined, and the reliability and efficiency of packet processing are increased. According to the advertisement information, the bridge node may further implement resource reservation for the TSN service packet and establishment of a forwarding table entry, thereby further improving the reliability and efficiency of packet processing. In addition, the advertisement information may be transmitted through protocol extended packets of different protocols, and the advertisement may be triggered through different advertisement trigger conditions, thereby improving flexibility of the advertisement.

An embodiment of the present application further provides an advertisement method applicable to a source apparatus. By sending advertisement information, the source apparatus provides a basis for the bridge node to establish a mapping table and determine whether the bridge node has a TSN-profile capability for the TSN service packet. By sending the TSN service packet on this basis, the bridge node can conveniently perform corresponding processing on the TSN service packet according to the mapping table, and the reliability of TSN service packet processing is improved.

Figure 7:
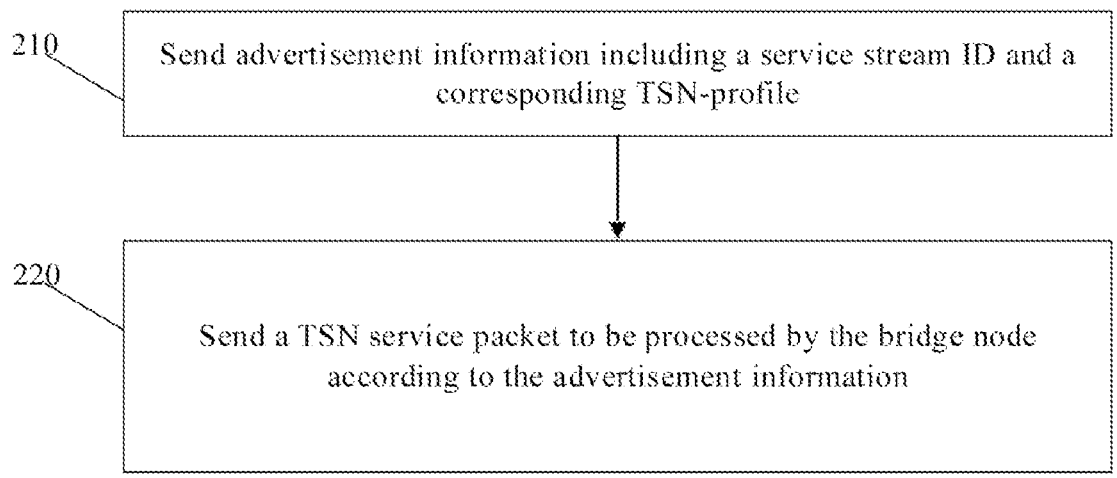
FIG. 7 is a flowchart of an advertisement method according to an embodiment of the present application.

FIG. 7 is a flowchart of an advertisement method according to an embodiment of the present application. As shown in FIG. 7, the advertisement method may include operations 210 and 220. It should be noted that operations performed by the source apparatus in the embodiments of the present application correspond to those performed by the bridge node in the foregoing embodiments, and details of the technique that is not described in the embodiments of the present application may refer to any of the foregoing implementations.

At operation 210, sending advertisement information including a service stream ID and a corresponding TSN-profile.

At operation 220, sending a TSN service packet to be processed by the bridge node according to the advertisement information.

In an implementation, an advertisement trigger condition for sending the advertisement information may include at least one of: receiving an advertisement trigger command, sending a first TSN service packet, or sending a protocol extended packet.

In an implementation, the advertisement information may be transmitted through a protocol extended packet of SRP; and the protocol extended packet includes a service stream ID field and a TSN-profile field.

In an implementation, the advertisement information may be transmitted through an LLDP packet; and a content field in the LLDP packet carries the service stream ID and the TSN-profile.

According to the advertisement method provided in the embodiments of the present application, the source apparatus may advertise the service stream ID and the corresponding TSN-profile to each bridge node, so that the bridge node can establish a mapping table, and, upon receiving a TSN service packet, query the mapping table to process the TSN service packet accordingly. Therefore, the TSN-profile capability of the bridge node is determined, and the reliability and efficiency of packet processing are increased. In addition, the advertisement information may be transmitted through protocol extended packets of different protocols, and the advertisement may be triggered through different advertisement trigger conditions, thereby improving flexibility of the advertisement.

Figure 8:
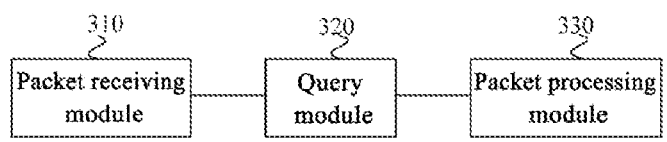
FIG. 8 is a schematic structural diagram of a packet processing device according to an embodiment of the present application.

An embodiment of the present application further provides a packet process device. FIG. 8 is a schematic structural diagram of a packet processing device according to an embodiment of the present application. As shown in FIG. 8, the packet processing device may include: a packet receiving module 310, a query module 320, and a packet processing module 330.

The packet receiving module 310 may be configured to receive a TSN service packet.

The query module 320 may be configured to query, according to a packet header of the TSN service packet, a mapping table of service stream IDs and TSN-profiles, where the mapping table is established according to advertisement information of a source apparatus.

The packet processing module 330 may be configured to process the TSN service packet according to a result of the querying.

The packet processing device provided in the embodiment of the present application may, upon receiving a TSN service packet, determine, by querying a mapping table established according to advertisement information of a source apparatus, whether the bridge node has a TSN-profile capability for the TSN service packet, so that the TSN service packet is processed accordingly, and the reliability of TSN service packet processing is improved.

In an implementation, the packet processing device may further include: an advertisement information acquisition module, which may be configured to, before querying, according to the packet header of the TSN service packet, the mapping table of service stream IDs and TSN-profiles, acquire the advertisement information of the source apparatus in response to an advertisement trigger condition, where the advertisement information includes a service stream ID and a corresponding TSN-profile; and a mapping relationship establishing module, which may be configured to extract, under the condition of meeting a preset condition, the service stream ID and the TSN-profile supported by the bridge node from the advertisement information, and write the service stream ID and the TSN-profile into a local mapping table.

In an implementation, the preset condition may include a case where: the service stream ID in the advertisement information is matched with a service stream ID of a response packet of a destination apparatus, and a bandwidth resource of the bridge node is greater than or equal to a bandwidth resource desired for the TSN service corresponding to the service stream ID.

In an implementation, the packet processing device may further include: a pre-processing module, which may be configured to, before querying, according to the packet header of the TSN service packet, the mapping table of service stream IDs and TSN-profiles, reserve, under the condition of meeting the preset condition, a bandwidth resource for processing the TSN service packet, and establish a forwarding table entry for the TSN service packet.

In an implementation, the packet processing module 330 may be configured to: use, if the packet header is consistent with the service stream ID and the TSN-profile supported by the bridge node, the reserved bandwidth resource to forward the TSN service packet to the destination apparatus according to the forwarding table entry.

In an implementation, the advertisement trigger condition may include at least one of: receiving an advertisement trigger command, receiving a first TSN service packet sent from the source apparatus, or receiving a protocol extended packet sent from the source apparatus.

In an implementation, the advertisement information may be transmitted through a protocol extended packet of SRP; and the protocol extended packet includes a service stream ID field and a TSN-profile field.

In an implementation, the advertisement information may be transmitted through an LLDP packet; and a content field in the LLDP packet carries the service stream ID and the TSN-profile.

The packet processing device provided in the embodiments of the present application and the packet processing method provided in the embodiments of the present application belong to a same inventive concept, details of the technique that is not described in the embodiments of the present application may refer to any of the foregoing implementations, and the packet processing device provided in the embodiments of the present application has the same beneficial effects as the packet processing method provided in the embodiments of the present application.

Figure 9:
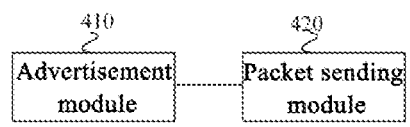
FIG. 9 is a schematic structural diagram of an advertisement device according to an embodiment of the present application.

An embodiment of the present application further provides an advertisement device. FIG. 9 is a schematic structural diagram of an advertisement device according to an embodiment of the present application. As shown in FIG. 9, the advertisement device may include an advertisement module 410 and a packet sending module 420.

The advertisement module 410 may be configured to send advertisement information including a service stream ID and a corresponding TSN-profile.

The packet sending module 420 may be configured to send a TSN service packet to be processed by the bridge node according to the advertisement information.

By sending advertisement information, the advertisement device provided in the embodiments of the present application may provide a basis for the bridge node to establish a mapping table and determine whether the bridge node has a TSN-profile capability for the TSN service packet. By sending the TSN service packet on this basis, the bridge node can conveniently perform corresponding processing on the TSN service packet according to the mapping table, and the reliability of TSN service packet processing is improved.

In an implementation, an advertisement trigger condition for sending the advertisement information may include at least one of: receiving an advertisement trigger command, sending a first TSN service packet, or sending a protocol extended packet.

In an implementation, the advertisement information may be transmitted through a protocol extended packet of SRP; and the protocol extended packet includes a service stream ID field and a TSN-profile field.

In an implementation, the advertisement information may be transmitted through an LLDP packet; and a content field in the LLDP packet carries the service stream ID and the TSN-profile.

The advertisement device provided in the embodiments of the present application and the advertisement method provided in the embodiments of the present application belong to a same inventive concept, details of the technique that is not described in the embodiments of the present application may refer to any of the foregoing implementations, and the advertisement device provided in the embodiments of the present application has the same beneficial effects as the advertisement method provided in the embodiments of the present application.

An embodiment of the present application further provides a bridge node. The packet processing method provided in the embodiments of the present application may be performed by a packet processing device, and the packet processing device may be implemented in software and/or hardware and integrated in the bridge node. The bridge node may be a TSN node apparatus.

Figure 10:
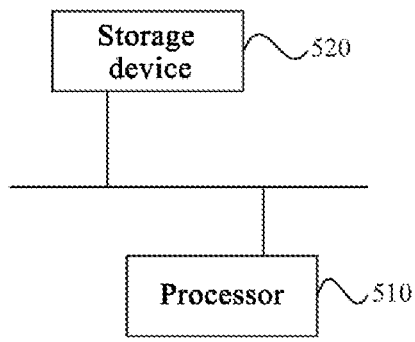
FIG. 10 is a schematic hardware structure diagram of a bridge node according to an embodiment of the present application.

FIG. 10 is a schematic hardware structure diagram of a bridge node according to an embodiment of the present application. As shown in FIG. 10, the bridge node may include: a processor 510 and a storage device 520. One or more processors 510 may be provided in the bridge node, and FIG. 10 illustrates one processor 510 as an example. The processors 510 and the storage device 520 in the apparatus may be connected via a bus or by other means, and FIG. 10 illustrates the connection via a bus as an example.

As a computer-readable storage medium, the storage device 520 in the bridge node may be configured to store one or more programs which, when executed by the one or more processors 510, cause the one or more processors 510 to implement the packet processing method described in any embodiment of the present application.

The programs may be software programs, computer-executable programs, and modules, such as program instructions/modules corresponding to the packet processing method in the embodiments of the present application (for example, modules in the packet processing device shown in FIG. 8, including: the packet receiving module 310, the query module 320, and the packet processing module 330). The processor 510 executes the software programs, instructions and modules stored in the storage device 520 to perform various functional applications and data processing of the bridge node, that is, to implement the packet processing method provided in any embodiment of the present application.

The storage device 520 mainly includes a program storage area and a data storage area. The program storage area may store an operating system, or an application program required for at least one function; and the data storage area may store data created according to the use of the apparatus, and the like (for example, the advertisement information, the mapping table, and the like in the above implementations). Further, the storage device 520 may include a high speed random access memory, and may further include a non-volatile memory, such as at least one magnetic disk memory device, flash memory device, or other non-volatile solid state memory devices. In an implementation, the storage device 520 may further include a memory remotely disposed relative to the processor 510, which may be connected to the bridge node via a network. Examples of such networks include, but are not limited to, the Internet, intranets, local area networks, mobile communication networks, and combinations thereof.

Further, when the one or more programs included in the bridge node are executed by the one or more processors 510, the following operations are performed: receiving a TSN service packet; querying, according to a packet header of the TSN service packet, a mapping table of service stream IDs and TSN-profiles, where the mapping table is established according to advertisement information of a source apparatus; and processing the TSN service packet according to a result of the querying on the mapping table.

The bridge node provided in the embodiments of the present application and the packet processing method provided in the embodiments of the present application belong to a same inventive concept, details of the technique that is not described in the embodiments of the present application may refer to any of the foregoing implementations, and the bridge node provided in the embodiments of the present application has the same beneficial effects as the packet processing method provided in the embodiments of the present application.

An embodiment of the present application further provides a source apparatus. The advertisement method may be performed by an advertisement device, and the advertisement device may be implemented in software and/or hardware and integrated in the source apparatus. The source apparatus may be a TSN node apparatus.

Figure 11:
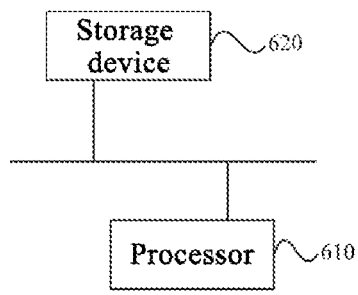
FIG. 11 is a schematic hardware structure diagram of a source apparatus according to an embodiment of the present application.

FIG. 11 is a schematic hardware structure diagram of a source apparatus according to an embodiment of the present application. As shown in FIG. 11, the source apparatus may include: a processor 610 and a storage device 620. One or more processors 610 may be provided in the source apparatus, and FIG. 11 illustrates one processor 610 as an example. The processors 610 and the storage device 620 in the device may be connected via a bus or by other means, and FIG. 11 illustrates the connection by a bus as an example.

As a computer-readable storage medium, the storage device 620 in the source apparatus may be configured to store one or more programs which, when executed by the one or more processors 610, cause the one or more processors 610 to implement the advertisement method described in any embodiment of the present application.

The programs may be software programs, computer-executable programs, and modules, such as program instructions/modules corresponding to the advertisement method in the embodiments the present application (for example, modules in the advertisement device shown in FIG. 9, including: the advertisement module 410 and the packet sending module 420). The processor 610 executes the software programs, instructions and modules stored in the storage device 620 to perform various functional applications and data processing of the source apparatus, that is, to implement the advertisement method provided in any embodiment of the present application.

The storage device 620 mainly includes a program storage area and a data storage area. The program storage area may store an operating system, or an application program required for at least one function; and the data storage area may store data created according to the use of the device, and the like (for example, the advertisement information, the TSN service packet, and the like in the above implementations). Further, the storage device 620 may include a high speed random access memory, and may further include a non-volatile memory, such as at least one magnetic disk memory device, flash memory device, or other non-volatile solid state memory devices. In an implementation, the storage device 620 may further include a memory remotely disposed relative to the processor 610, which may be connected to the source apparatus via a network. Examples of such networks include, but are not limited to, the Internet, intranets, local area networks, mobile communication networks, and combinations thereof.

Further, when the one or more programs included in the source apparatus are executed by the one or more processors 610, the following operations are performed: sending advertisement information including a service stream ID and a corresponding TSN-profile; and sending a TSN service packet.

The source apparatus provided in the embodiments of the present application and the advertisement method provided in the embodiments of the present application belong to a same inventive concept, details of the technique that is not described in the embodiments of the present application may refer to any of the foregoing implementations, and the source apparatus provided in the embodiments of the present application has the same beneficial effects as the advertisement method provided in the embodiments of the present application.

Figure 12:
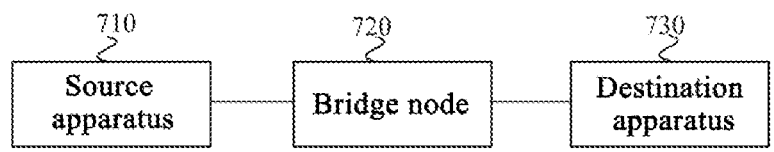
FIG. 12 is a schematic structural diagram of a packet processing system according to an embodiment of the present application.

An embodiment of the present application further provides a packet process system. FIG. 12 is a schematic structural diagram of a packet processing system according to an embodiment of the present application. As shown in FIG. 12, the system may include: a destination apparatus 730, at least one bridge node 720, and a source apparatus 710. The source apparatus 710 sends advertisement information to each bridge node 720. A TSN service packet sent from the source apparatus 710 is processed by the at least one bridge node 720 according to the advertisement information, and then forwarded to the destination apparatus 730.

According to the packet processing system provided in the embodiment of the present application, information sent from the source apparatus 710 goes through several bridging processes before reaching the destination apparatus 730. Each bridge node 720 has a distributed clock for time synchronization, and a queue is used for processing priorities of data, including a fast channel mode for high dynamic data and a preemptive mechanism.

In an implementation, the source apparatus 710 may be configured to send advertisement information including a service stream ID and a corresponding TSN-profile; and send a TSN service packet.

In an implementation, the bridge node 720 may be configured to receive a TSN service packet; query, according to a packet header of the TSN service packet, a mapping table of service stream IDs and TSN-profiles, where the mapping table is established according to advertisement information of the source apparatus 710; and process the TSN service packet according to a result of the querying on the mapping table.

In an implementation, the bridge node 720 may be configured to before querying, according to the packet header of the TSN service packet, the mapping table of service stream IDs and TSN-profiles, further acquire the advertisement information of the source apparatus 710 in response to an advertisement trigger condition, where the advertisement information includes a service stream ID and a corresponding TSN-profile; and extract, under the condition of meeting a preset condition, the service stream ID and the TSN-profile supported by the bridge node 720 from the advertisement information, and write the service stream ID and the TSN-profile into a local mapping table.

In an implementation, the preset condition may include a case where: the service stream ID in the advertisement information is matched with a service stream ID of a response packet of the destination apparatus 730, and a bandwidth resource of the bridge node 720 is greater than or equal to a bandwidth resource desired for the TSN service corresponding to the service stream ID.

In an implementation, the bridge node 720 may be configured to before querying, according to the packet header of the TSN service packet, the mapping table of service stream IDs and TSN-profiles, reserve, under the condition of meeting the preset condition, a bandwidth resource for processing the TSN service packet, and establish a forwarding table entry for the TSN service packet.

In an implementation, the bridge node 720 may be configured to perform the following operations to implement processing the TSN service packet according to the result of the querying, including: using, in response to determining that the packet header is consistent with the service stream ID and the TSN-profile supported by the bridge node 720, the reserved bandwidth resource to forward the TSN service packet to the destination apparatus 730 according to the forwarding table entry.

In an implementation, the advertisement trigger condition may include at least one of: receiving an advertisement trigger command, receiving a first TSN service packet sent from the source apparatus 710, or receiving a protocol extended packet sent from the source apparatus 710.

In an implementation, the advertisement information may be transmitted through a protocol extended packet of SRP;

and the protocol extended packet includes a service stream ID field and a TSN-profile field.

In an implementation, the advertisement information may be transmitted through an LLDP packet; and a content field in the LLDP packet carries the service stream ID and the TSN-profile.

The packet processing system provided in the embodiments of the present application and the packet processing method or advertisement method provided in the embodiments of the present application belong to a same inventive concept, details of the technique that is not described in the embodiments of the present application may refer to any of the foregoing implementations, and the packet processing system provided in the embodiments of the present application has the same beneficial effects as the packet processing method or advertisement method provided in the embodiments of the present application.

An embodiment of the present application further provides a storage medium having computer-executable instructions stored thereon which, when executed by a computer processor, cause the computer processor to perform the packet processing method or advertisement method described in any embodiment of the present application.

The packet processing method may include: receiving a TSN service packet; querying, according to a packet header of the TSN service packet, a mapping table of service stream IDs and TSN-profiles, where the mapping table is established according to advertisement information of a source apparatus; and processing the TSN service packet according to a result the querying on the mapping table.

The advertisement method may include: sending advertisement information including a service stream ID and a corresponding TSN-profile; and sending a TSN service packet.

Through the description of the above implementations, those skilled in the art may understand that the present application may be implemented by means of software and general hardware, or by hardware. Based on such understanding, the technical solution the present application may be embodied in the form of software products. The computer software product may be stored in a computer-readable storage medium, such as a computer floppy disk, a read-only memory (ROM), a random access memory (RAM), a flash memory (FLASH), a hard disk or an optical disk, and includes a plurality of instructions for causing a computer apparatus (which may be a personal computer, a server, or a network apparatus, etc.) to perform the method described in any implementation of the present application.

The above are only exemplary embodiments of the present application and not intended to limit the scope of the present application.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented using any suitable data storage technology, such as but not limited to, read-only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field-programmable gate arrays (FGPAs), and processors based on multi-core processor architecture.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the present application. Accordingly, the proper scope of the present application is to be determined according to the claims.

What is claimed is:

1. A packet processing method, applied to a bridge node, comprising:
   receiving a time sensitive networking (TSN) service packet;
   querying, according to a packet header of the TSN service packet, a mapping table in the bridge node to determine whether the bridge node has a TSN-profile for processing the TSN service packet, wherein the mapping table is established according to advertisement information of a source apparatus and records service stream identifiers (IDs) and TSN-profiles supported by the bridge node; and
   processing the TSN service packet according to a result of the querying on the mapping table.

2. The method according to claim 1, before querying, according to the packet header of the TSN service packet, the mapping table, further comprising:
   acquiring the advertisement information of the source apparatus in response to a trigger condition, wherein the advertisement information comprises a service stream ID and a corresponding TSN-profile; and
   extracting, under a condition of meeting a preset condition, the service stream ID and the TSN-profile supported by the bridge node from the advertisement information, and writing the service stream ID and the TSN-profile into the mapping table.

3. The method according to claim 2, wherein the preset condition comprises a case where:
   the service stream ID in the advertisement information is matched with a service stream ID of a response packet of a destination apparatus, and a bandwidth resource of the bridge node is greater than or equal to a bandwidth resource desired for a TSN service corresponding to the service stream ID.

4. The method according to claim 2, wherein the trigger condition comprises at least one of:
   receiving an advertisement trigger command;
   receiving a first TSN service packet sent from the source apparatus; or
   receiving a protocol extended packet sent from the source apparatus.

5. The method according to claim 2, wherein the advertisement information is transmitted through a protocol extended packet of a Stream Reservation Protocol (SRP); and
   the protocol extended packet comprises a service stream ID field and a TSN-profile field.

6. The method according to claim 2, wherein the advertisement information is transmitted through Link Layer Discovery Protocol (LLDP) packet; and
   a content field in the LLDP packet carries the service stream ID and the TSN-profile.

7. The method according to claim 3, before querying, according to the packet header of the TSN service packet, the mapping table, further comprising:
reserving, under the condition of meeting the preset condition, a bandwidth resource for processing the TSN service packet, and establishing a forwarding table entry for the TSN service packet.

8. The method according to claim 3, wherein the advertisement information is transmitted through a protocol extended packet of a Stream Reservation Protocol (SRP); and
the protocol extended packet comprises a service stream ID field and a TSN-profile field.

9. The method according to claim 3, wherein the advertisement information is transmitted through Link Layer Discovery Protocol (LLDP) packet; and
a content field in the LLDP packet carries the service stream ID and the TSN-profile.

10. The method according to claim 7, wherein processing the TSN service packet according to the result of the querying comprises:
using, in response to determining that the packet header is consistent with the service stream ID and the TSN-profile supported by the bridge node, the reserved bandwidth resource to forward the TSN service packet to the destination apparatus according to the forwarding table entry.

11. The method according to claim 7, wherein the advertisement information is transmitted through a protocol extended packet of a Stream Reservation Protocol (SRP); and
the protocol extended packet comprises a service stream ID field and a TSN-profile field.

12. The method according to claim 1, wherein the advertisement information is transmitted through a protocol extended packet of a Stream Reservation Protocol (SRP); and
the protocol extended packet comprises a service stream ID field and a TSN-profile field.

13. The method according to claim 1, wherein the advertisement information is transmitted through Link Layer Discovery Protocol (LLDP) packet; and
a content field in the LLDP packet carries the service stream ID and the TSN-profile.

14. An advertisement method, applied to a source apparatus, comprising:
sending advertisement information comprising a service stream identifier (ID) and a corresponding time sensitive networking (TSN)-profile; and
sending a TSN service packet, wherein the TSN service packet is to be processed by a bridge node according to the advertisement information,
wherein the advertisement information is used by the bridge node to establish a mapping table, which records service stream IDs and TSN-profiles supported by the bridge node, in the bridge node according to the advertisement information, such that the TSN service packet is processed by the bridge node by: querying, according to a packet header of the TSN service packet, the mapping table to determine whether the bridge node has a TSN-profile for processing the TSN service packet; and processing the TSN service packet according to a result of the querying on the mapping table.

15. The method according to claim 14, wherein a trigger condition for sending the advertisement information comprises at least one of:
receiving an advertisement trigger command;
sending a first TSN service packet; or
sending a protocol extended packet.

16. A bridge node, comprising:
one or more processors; and
a storage device configured to store one or more programs; wherein
the one or more programs, when executed by the one or more processors, cause the one or more processors to implement the packet processing method according to claim 1.

17. A source apparatus, comprising:
one or more processors; and
a storage device configured to store one or more programs; wherein
the one or more programs, when executed by the one or more processors, cause the one or more processors to implement the advertisement method according to claim 14.

18. A packet processing system, comprising: a destination apparatus, at least one bridge node, and a source apparatus; wherein:
the source apparatus is configured to send advertisement information to the at least one bridge node, the advertisement information comprising a service stream identifier (ID) and a corresponding time sensitive networking (TSN)-profile;
each of the at least one bridge node is configured to receive a TSN service packet; query, according to a packet header of the TSN service packet, a mapping table in the bridge node to determine whether the bridge node has a TSN-profile for processing the TSN service packet, wherein the mapping table profiles is established according to the advertisement information of the source apparatus and records service stream IDs and TSN-profiles supported by the bridge node; and process the TSN service packet according to a result of the querying on the mapping table; and
the destination apparatus is configured to receive the TSN service packet processed by the at least one bridge node.

19. A non-transitory computer-readable storage medium storing a computer program thereon which, when executed by a processor, causes the processor to perform the packet processing method according to claim 1.

20. A non-transitory computer-readable storage medium storing a computer program thereon which, when executed by a processor, causes the processor to perform the advertisement method according to claim 14.

* * * * *